United States Patent [19]

Yonekura et al.

[11] Patent Number: 4,785,045

[45] Date of Patent: Nov. 15, 1988

[54] THERMOPLASTIC ELASTOMER COMPOSITION

[75] Inventors: Katsuyoshi Yonekura; Akira Uchiyama; Akira Matsuda, all of Ichihara, Japan

[73] Assignee: Mitsui Petrochemical Industries, Ltd., Tokyo, Japan

[21] Appl. No.: 6,282

[22] Filed: Jan. 20, 1987

Related U.S. Application Data

[63] Continuation of Ser. No. 729,351, May 1, 1985, abandoned.

[30] Foreign Application Priority Data

May 2, 1984 [JP] Japan ................................. 59-87768
May 2, 1984 [JP] Japan ................................. 59-87769

[51] Int. Cl.$^4$ ..................... C08L 23/16; C08L 23/26; C08L 23/18; C08L 23/10
[52] U.S. Cl. ................................... 524/528; 524/525; 525/194; 525/240; 525/211
[58] Field of Search ................. 525/194, 240; 524/528

[56] References Cited

U.S. PATENT DOCUMENTS

| | | | |
|---|---|---|---|
| 4,088,714 | 5/1978 | Huff | 525/194 |
| 4,212,787 | 7/1980 | Matsuda et al. | 260/33.6 |
| 4,454,092 | 6/1984 | Shimizu et al. | 525/240 |

OTHER PUBLICATIONS

New Polyethylenes–Package Engineering, pp. 39–40, 2/80.

New Materials–Plastic World, p. 86, 12/79.

*Primary Examiner*—Carman J. Seccuro
*Attorney, Agent, or Firm*—Wenderoth, Lind & Ponack

[57] ABSTRACT

A thermoplastic elastomer composition composed of a partially crosslinked product of a blend consisting mainly of (a) 80 to 10 parts by weight of a peroxide-crosslinkable olefinic copolymer rubber, (b) 10 to 80 parts by weight of a peroxide-crosslinkable polyolefin resin having specific properties and (c) 50 to 10 parts by weight of a peroxide-decomposable polyolefin resin, the total amount of (a)+(b)+(c) being 100 parts by weight, the crosslinked product is obtained by dynamically heat-treating said blend in the presence of (d) an organic peroxide. The thermoplastic elastomer has excellent film formability, and is useful as a waterproof sheet.

12 Claims, No Drawings

THERMOPLASTIC ELASTOMER COMPOSITION

This application is a continuation of application Ser. No. 729,351 filed May 1, 1985, now abandoned.

BACKGROUND OF THE INVENTION

1. Field of the Invention

This invention relates to a partially crosslinked olefinic thermoplastic elastomer composition having excellent film formability and being useful as a waterproof sheet.

2. Description of the Prior Art

Rubber products generally have found extensive use in applications which require elasticity and flexibility. Molding of the rubber products, however, does not lend itself to mass production of process problems such as the need for vulcanization. rubber substitutes have therefore been investigated which can be molded without vulcanization and have rubber-like properties.

Flexible plastics such as flexible vinyl chloride resins, ethylene/vinyl acetate copolymer and low-density polyethylene are known as such materials having rubber-like properties. They have good moldability and excellent flexibility, but have the defect of poor heat resistance, mechanical strength and repulsive elasticity (rebound) which greatly restrict their utility.

Attempts have also been made to increase the heat resistance and mechanical strength of such flexible plastics by mixing them with plastics having high melting points such as high-density polyethylene or polypropylene. Mixing of such high-melting plastics, however, degrades the inherent flexibility of such flexible plastics. Moreover, molded articles of good quality cannot be obtained from such mixtures because sinks and other imperfections occur during extrusion or injection molding.

In recent years, so-called thermoplastic elastomers have attracted attention as materials having properties intermediate between those of vulcanized rubbers and flexible plastics.

As such a thermoplastic elastomer, the present inventors previously proposed a thermoplastic elastomer obtained by dynamically heat-treating a peroxide-crosslinkable olefinic copolymer, a peroxide-crosslinkable polyolefin resin, an organic peroxide, a crosslinking aid and a polyolefin resin not crosslinkable with the peroxide (Japanes Laid-Open Patent Publication No. 71739/1980).

This thermoplastic elastomer has excellent heat resistance, tensile properties, weatherability, flexibility and rebound, and can easily be molded into articles free from flow marks by extrusion or injection molding. Particularly, it can be molded very satisfactorily into large-sized and thick articles. Its film formability is still not satisfactory enough, and it cannot fully satisfactorily find applications as a surface sheet of interior trimming materials of automobiles, for example floors, walls, ceilings, inner trunk walls, or seat backs, nor can a waterproof sheet be obtained from it which meets the standards of vulcanized rubbers in "Polymer Roofing" stipulated in "JIS A-6008".

SUMMARY OF THE INVENTION

The present inventors have found that a thermoplastic elastomer having excellent film formability as well as excellent heat resistance, tensile properties and other properties can be obtained by blending a specific peroxide-crosslinkable polyolefin resin with a peroxide-crosslinkable olefinic copolymer and a peroxide-decomposable polyolefin resin and dynamically heat-treating the blend in the presence of an organic peroxide.

The present inventors have also found that the aforesaid thermoplastic elastomer of the invention can be easily molded by various molding means such as a calender molding machine or an extruder, and that a waterproof sheet having excellent weatherability, ozone resistance, heat resistance, cold resistance, adaptability to the contour of a substrate (referred to as substrate adaptability), and adhesion to itself can be obtained by molding the thermoplastic elastomer.

It is an object of this invention to provide a thermoplastic elastomer having excellent film formability as well as excellent heat resistance, tensile properties, weatherability, flexibility, rebound and other properties.

Another object of this invention is to provide a waterproof sheet having excellent weatherability, ozone resistance, heat resistance, cold resistance, substrate adaptability and adhesion to itself.

According to this invention, there is provided a thermoplastic elastomer composed of a partially crosslinked product of a blend consisting mainly of (a) 80 to 10 parts by weight of a peroxide-crosslinkable olefinic copolymer rubber, (b) 10 to 80 parts by weight of a peroxide-crosslinkable polyolefin resin, and (c) 50 to 10 parts by weight of a peroxide-decomposable polyolefin resin, the total amount of (a)+(b)+(c) being 100 parts by weight, said crosslinked product being obtained by dynamically heat-trating said blend in the presnece of (d) an organic peroxide, and said peroxide-crosslinkable polyolefin resin (b) being a random copolymer of ethylene and an alpha-olefin having 4 to 10 carbon atoms which has an ethylene content of from 90 to 99.5 mole %, a melt index of from 0.1 to 50 g/10 min., a density of from 0.910 to 0.940 g/cm$^3$ and a melting point of from 115° to 130° C.

The invention also provides a waterproof sheet molded from the aforesaid thermoplastic elastomer.

DETAILED DESCRIPTION OF THE INVENTION (a) Peroxide-crosslinkable olefinic copolymer rubber The peroxide-crosslinkable olefinic copolymer rubber (a) used in this invention denotes an amorphous elastomeric copolymer comprising an olefin as a main component, such as ethylene/propylene/non-conjugated diene copolymer rubbers or ethylene/butadiene copolymer rubber, which when mixed with the organic peroxide (d) and kneaded under heat, is crosslinked to decrease in flowability or to fail to flow. The non-conjugated diene denotes, for example, dicyclopentadiene, 1,4-hexadiene, dicyclooctadiene, methylenenorbornene, and ethylidenenorbornene.

Suitable copolymer rubbers (a) are ethylene/propylene copolymer rubbers and ethylene/propylene/non-conjugated diene copolymer rubbers in which the mole ratio of the ethylene units to propylene units is from 50:50 to 90:10, particularly from 55:45 to 85:15. Of these, the ethylene/propylene/non-conjugated diene copolymer rubbers, particularly an ethylene/propylene/ethylidenenorbornene copolymer rubber, are preferred because they give thermoplastic elastomers having excellent heat resistance, tensile properties and rebound.

These copolymer rubbers preferably have a Mooney viscosity (ML$_{1+4}$, 150° C.) of from 10 to 200, especially from 40 to 200. If the Mooney viscosity is less than 10, the resulting thermoplastic elastomer has poor tensile properties. If it exceeds 200, the resulting elastomer has poor flowability.

Preferably, these copolymer rubbers (a) have an iodine number (the degree of unsaturation) of not more than 40. Within this iodine number range, a thermoplastic elastomer haivng flowability and rubbery properties in a well-balanced combination can be obtained.

(b) Peroxide-crosslinkable polyolefin resin

The peroxide-crosslinkable polyolefin resin (b) used in this invention denotes a polyolefin resin which when mixed with the organic peroxide (d) and kneaded under het, decreases in flowability or fails to flow.

In the present invention, a random copolymer of ethylene with an alpha-olefin having 4 to 10 carbon atoms, preferably 5 to 10 carbon atoms, is used as the polyolefin resin (b). This random copolymer also embraces so-called linear low-density polyethylene (to be sometimes referred to hereinbelow as LLDPE).

Examples of the alpha-olefin having 4 to 10 carbon atoms to be copolymerized with ethylene in this random copolymer include 1-butene, 1-pentene, 1-hexene, 4-methyl-1-pentene, 1-octene, B 1-decene, and mixtures of at least two of these with each other. Alpha-olefins having 5 to 10 carbon atoms are preferred, and those having 6 to 8 carbon atoms, above all 4-methyl-1-pentene, are especially preferred.

It is critical that this random copolymer should have an ethylene content of 90 to 99.5 mole %, preferably 94 to 99 mole %, especially preferably 95 to 99 mole %. If the ethylene content exceeds 99.5 mole %, the resulting thermoplastic elastomer lacks flexibility. If it is less than 90 mole %, the resin blend becomes sticky after the dynamic heat-treatment and also has reduced heat resistance. Hence, ethylene contents outside the specified range are undesirable.

Preferably, the random copolymer has a crystallinity, measured by an X-ray diffraction method, of 40 to 70%. It is essential that the random copolymer (b) should have a melt index, measured at 190° C. under a load of 2160 g in accordance with the method of ASTM D-1238, of 0.1 to 50 g/10 min., preferably 0.5 to 30 g/10 min., a density of 0.910 to 0.940 g/cm$^3$, preferably 0.915 to 0.935 g/cm$^3$, and a melting point, measured by ASTM D-2117, of 115° to 130° C., preferably 115° to 125° C. Thermoplastic elastomers having excellent film formability, flexibility and heat resistance as shown in Examples to be given hereinbelow cannot be obtained if any of the melt index (MI for short), density and melting point of the random copolymer falls outside the above-specified ranges.

For example, if the melt index is lower than 0.1 g/10 min., the film formability (extrudability) of the resulting thermoplastic elastomer is reduced. If it is higher than 50 g/10 min., the resulting thermoplastic elastomer has reduced tensile strength.

The above randm copolymer of ethylene with an alpha-olefin having 4 to 10 carbon atoms can be produced, for example, by the process described in detail in Japanese Laid-Open Patent Publication No. 92887/1978.

The thermoplastic elastomer of the invention having excellent film formability is obtained by combining the random copolymer (b) described above with the resin (a) and the resin (c) to be described below. If, for example, it is combined with low-density polyethylene, an elastomer having excellent film formability cannot be obtained.

(c) Peroxide-decomposable polyolefin resin

The peroxide-decomposable polyolefin resin (c) used in this invention denotes a polyolefin resin which when mixed with the organic peroxide (d) and kneaded under heat, is not crosslinked, and does not decrease in flowability. When it is thermally reacted with the organic peroxide (d), decomposition and crosslinking reactions occur competitively. But the decomposition reaction predominates, and consequently, the apparent molecular weight of the polymer decreases.

Examples of such a polyolefin resin include homopolymers of alpha-olefins having at least 3 carbon atoms, and copolymers of two or more of these alpha-olefins. Suitable polyolefin resins (c) used in this invention are homopolymers and copolymers of propylene, 1-butene, 4-methyl-1-pentene, 1-hexene, 1-octene and 1-decene. Polypropylene and propylene copolymers usually containing at least 50 mole % of propylene are preferred.

Preferably, the polyolefin resin (c) has a melt index of about 0.1 to 50 g/10 min., especially 5 to 20 g/10 min. although it varies depending upon the type of the resin.

(d) Organic peroxide

Examples of the organic peroxide (d) used in this invention include dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropylcarbonate, diacetyl peroxide, lauroyl peroxide and tert-butyl cumyl peroxide.

Of these, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butyl peroxy)valerate are preferred in view of their odor and scorch stability. 1,3-bis(tert-butylperoxyisopropyl)benzene is most preferred.

Preparation of the thermoplastic elastomer

In order to impart film formability to the thermoplastic elastomer of this invention, the peroxide-crosslinkable polyolefin resin (b) described above is used in combination with the peroxide-crosslinkable olefinic copolymer rubber (a) and the peroxide-decomposable polyolefin resin (c).

According to this invention, 80 to 10 parts by weight, preferably 60 to 30 parts by weight, of the peroxide-crosslinkable olefinic copolymer rubber (a), 10 to 80 parts by weight, preferably 20 to 40 parts by weight, of the peroxide-crosslinkable polyolefin resin (b) and 50 to 10 parts by weight, preferably 40 to 20 parts by weight, of the peroxide-decomposable polyolefin resin (c) are blended so that the total amount of (a) +(b)+(c) becomes 100 parts by weight, and the blend is dynamically heat-treated in the presence of the oraganic peroxide (d) to crosslink the blend partially.

If the proportion of the peroxide-crosslinkable polyolefin resin (b) is larger than the upper limit of the specified range, the resulting thermoplastic elastomer has reduced flowability and consequently reduced moldability. If it is less than the lower limit of the specified range, the desired film formability cannot be obtained.

If the proportion of the peroxide-decomposable polyolefin resin (c) is larger than the upper limit of the specified range, the flexibility properties of the obtained thermoplastic elastomer is degraded. If it is smaller than the specified limit, the resulting thermoplastic elstomer has insufficient heat resistance, flowability and moldability.

The amount of the organic peroxide (d) is 0.05 to 3% by weight, preferably 0.1 to 1% by weight, based on the total weight of the components (a), (b) and (c). If it is smaller than the specified limit, the degrees of crosslinkage of the components (a) and (b) are too small so that the heat resistance, tensile properties, elastic recovery, rebound and strength of the resulting thermoplastic elastomer are not sufficient. If it is larger than the specified limit, the degrees of crosslinkage of the components (a) and (b) increase, and the resulting thermoplastic elastomer has reduced moldability.

The partially crosslinked thermoplastic elastomer of this invention is obtained by adding the organic peroxide (d) to the blend of the components (a) to (c), and dynamically heat-treating the mixture.

The "partial crosslinking", as referred to herein, means that the degree of crosslinkage, in terms of the gel content measured by the following method, is 45 to 98%.

Method of measuring the gel content

About 100 mg of sample pellets of the thermoplastic elastomer are weighed, and immersed for 48 hours in 30 cc (which is sufficient for the amount of the sample) of cyclohexane in a closed vessel. The sample is taken out onto filter paper and dried at room temperature for at least 72 hours until it becomes constant in weight. The gel content of the sample is calculated in accordance with the following equation.

$$\text{Gel content (\%)} = \frac{\text{dry weight of the sample after immersion in cyclohexane}}{\text{weight of the sample before immersion in cyclohexane}} \times 100$$

The expression "dynamical heat-treatment" means that the resin blend is kneaded in the molten state.

The kneading is preferably carried out in a non-open device in an atmosphere of an inert gas such as nitrogen or carbon dioxide. The kneading temperature is that temperature at which the organic peroxide used has a half life of less than 1 minute, usually 150° to 280° C., preferably 170° to 240° C. The kneading time is usually 1 to 20 minutes, preferably 1 to 10 minutes. The shear force to be applied during the kneading operation is usually 10 to $14^4$ sec$^{-1}$, preferably $10^2$ to $10^3$ sec$^{-1}$ in terms of shear speed.

Examples of suitable kneading devices are mixing rolls, intensive mixers (e.g., Banbury mixer), kneaders, and single-screw or twin-screw extruders. Preferably, they are of the non-open type.

In the partial crosslinking treatment according to this invention, a crosslinking aid may be used in an amount of 0.05 to 3% by weight based on the total weight of the components (a), (b) and (c). Examples of the crosslinking aids include p-quinonedioxime, p,p'-dibenzoyl quinonedioxime, N-methyl-N,4-dinitrosoaniline, nitrobenzene, diphenyl guanidine, trimethylolpropane-N,N'-m-phenylene dimaleimide, divinylbenzene, triallyl cyanurate, ethylene glycol dimmethacrylate, diethylene glycol dimethacrylate, polyethylene glycol dimethacrylate, trimethylolpropane trimethacrylate, allyl methacrylate, vinyl butyrate and vinyl stearate. By using such as crosslinking aid, a uniform and mild crosslinking reaction is expected to proceed. In particular, when divinylbenzene is used as the crosslinking aid in this invention, its handling is easy and moreover, a thermoplastic elatomer having flowability and various other properties in a well-balanced combination can be obtained. Specifically, since divinylbenzene is a liquid at ordinary temperature and can dissolve the organic peroxide (d) as well as the components (a), (b) and (c), it acts as a dispersing aid and a diluent for the organic peroxide and improves the dispersibility of the organic peroxide in the resin components. Hence, divinylbenzene serves to induce uniform and moderate crosslinking. Furthermore, divinylbenzene itself becomes a radial and acts as a chain-transfer agent and a crosslinking agent. The use of divinylbenzene in combination with the organic peroxide is expected to produce a greater crosslinking effect than the use of the organic peroxide alone.

As required, a softening agent of the mineral oil type may be incorporated in the resin blend prior to the partial crosslinking treatment. Mineral oil-type softening agents are high-boiling pertroleum fractions, classed as paraffinic, naphthenic and aromatic, which are normally used in roll processing of rubber in order to weaken the intermolecular attracting force of rubber and facilitate its processing, aid in dispersing carbon black, white carbon, etc., or to reduce the hardness of vulcanized rubber and increase its flexibility and elasticity. The mineral oil-type softening agent may be used in an amount of not more than 50% by weight based on the total weight of the components (a), (b) and (c). If it is used in an amount larger than the specified limit, the resulting thermoplastic elastomer has reduced heat resistance or its appearance is impaired owing to the bleed out of the softening agent. This mineral oil can also be incorporated as an extended oil in advance in the peroxide-crosslinkable olefinic copolymer rubber.

As required, the thermoplastic elastomer of this invention may further contain fillers, coloring agents, antioxidants, light stabilizers, processing aids, antistatic agents or other property improving agents in amounts which do not impair the its strength, modability and rubbery properties. These additives may be incorporated at any stage in the manufacturing process described above.

Examples of the fillers are carbon black, clay, talc, calcium carbonate, kaolin, diatomaceous earth, silica, alumina, asbestos, graphite, glass fibers and various whiskers. Examples of the antioxidants include amine-type antioxidants such as phenyl-alphanaphthylamine, p-isoproxy-diphenylamine, N,N'-diphenylethylenediamine, and nonylated diphenylamine; and phenolic antioxidants such as 2,6-ditert-butylphenol, styrenated phenol, butylhydroxyanisole, 4,4'-hydroxydiphenyl, 2,2-methylenebis-(4-methyl-6-cyclohexylphenol), tetrakis-(methylene-3-(3',5'-ditert-butyl-4'-hydroxyphenyl)propionate)methane, tris-(2-methyl-hydroxy-5-di-tert-butylphenyl)butane.

In order to decompose the organic peroxide (d), a tertiary amine such as triethylamine, tributylamine or 2,4,6-tris(dimethylamino)phenol, a naphthenic acid salt of aluminum, cobalt, vanadium, copper, calcium, zirconium, manganese, magnesium, lead, or mercury, an organic metal carboxylate such as an octanoate salt, etc. may be used together in the dynamic heat-treatment step.

Molding of the thermoplastic elastomer

The thermoplastic elastomer of this invention so obtained may be molded by devices used in the molding of ordinary thermoplastic polymers. For example, it is suitably molded by extrusion, calendering or injection molding.

Since the component (b) of the thermoplastic elastomer of this invention is partially crosslinked, it has particularly superior film formability. For example, it can be molded into a sheet having a thickness as small as 0.08 mm. Such a sheet is suitable as a surface sheet of interior trimming materials of automobiles, for example in floors, walls, ceilings, inner trunk walls, or seat backs.

Furthermore, since the components (a) and (b) are crosslinked, the thermoplastic elastomer of this invention has excellent heat resistance, weatherability and rubber properties such as tensile properties, flexibility and rebound, and good flowability. Consequently, it can also be molded into large-sized thick articles having good appearance free from flow marks or sinks.

A thermoplastic elastomer in accordance with this invention which is produced by using 50 to 20 parts by weight, preferably 50 to 30 parts by weight, of the peroxide-crosslinkable olefinic copolymer rubber (a), 30 to 50 parts by weight, preferably 30 to 40 parts by weight, of the peroxide-crosslinkable polyolefin resin (b) and 20 to 50 parts by weight, preferably 20 to 40 parts by weight, of the peroxide-decomposable polyolefin resin (c) is especially useful as a material for a waterproof sheet which meets the standards of vulcanized rubbers in "Polymer Roofing" stipulated in JIS A-6008.

Waterproof sheet

The waterproof sheet molded from the aforesaid thermoplastic elastomer has the following advantages.

(1) The sheet can be easily produced by a simple processing operation such as calender molding or extrusion molding.

(2) The sheet has excellent weatherability, heat resistance, cold resistance, ozone resistance and substrate adaptability.

(3) The sheet can be bonded to itself easily and accurately because it has very good hot-melt adhesiveness, and heat sealability.

(4) The sheet has a low initial modulus of elasticity and is flexible.

(5) The sheet fully meets the standards of vulcanized rubbers used as synthetic polymeric roofings which are set forth in JIS A-6008 (1981).

(6) A dope-dyed color sheet can be easily obtained when a white filler is used or no filler is used.

A so-called sheet waterproofing method is known to waterproof the rooftop of a building, or in the construction of a pond. This sheet waterproofing method is desired to integrate a waterproof layer by bonding a sheet to itself or to a substrate at a plate of job. Usually, a polyvinyl chloride sheet or a sheet of a mixture of butyl rubber and an ethylene/propylene/diene copolymer rubber is used as the sheet. The rubber sheet meets any requirements of a waterproof sheet, such as weatherability, ozone resistance, heat resistance, cold resistance, substrate adaptability. But since it has poor adhesiveness, an accident of water leakage from a part where the sheet is bonded to itself occurs frequently. Furthermore, since such a sheet is produced by a series of many steps including a step of kneading the rubber components with a filler such as carbon black, a step of molding the kneaded mixture by calendering, and a vulcanizing step, it naturally becomes expensive.

The polyvinyl chloride sheet can be easily molded by a calender molding machine, an extruder, etc., but does not prove satisfactory in weatherability, cold resistance, heat resistance and substrate adaptability. Furthermore, imperfections tend to occur in a part where the sheet is bonded to itself.

It will therefore be understood that a waterproof sheet of this invention having the aforesaid advantages is very useful.

Such a waterproof sheet can be easily obtained by subjecting the aforesaid thermoplastic elastomer to an ordinary sheet-forming method.

For example by extruding the thermoplastic elastomer in the molten state from a T-die at a temperature of, for example, 180° to 250° C., a sheet having a thickness of about 0.1 to about 3 mm can be easily produced. The sheet can also be produced by molding the thermoplastic elastomer stock kneaded by a Banbury mixer, a roll, etc. and heated to a temperature above its softening point into a sheet by a calender roll. It is the general practice in this case to make a final waterproof sheet by welding several such sheets by an embossing roll, etc.

The waterproof sheet of this invention has very good adhesiveness and excellent processability, applicability, weatherability, heat resistance and other properties and can be used, for example, in the following manner.

A sheet, about 20 m × 1 m × 1.5 mm, is melt-bonded to itself at its end portions at a place of job by using a hot air blower or the like to make a unitary membrane. Alternatively, the sheet is heat-bonded in a factory by using a hot air blower, a heat sealer, etc. so that its width becomes about 2 to 20 m. In such forms, the waterproof sheet of this invention can be effectively applied to all objects to which conventional waterproof sheets can be applied, for example in the waterproofing of the roof tops of buildings, and in the construction of ponds in a golf course, irrigation waterways, ponds for treating waste waters from factories, eel cultivating ponds, dams, and tunnels.

The following examples illustrate the present invention more specifically.

EXAMPLE 1

By a Henschel mixer, 55 parts by weight of ethylene/propylene/dicyclopentadiene copolymer rubber pellets (to be referred to as EPDM (a)) having an ethylene content of 78 mole %, an iodine number of 20 and a Mooney viscosity ($ML_{1+4}$, 121° C.) of 55, 20 parts by weight of ethylene/4-methyl-1-pentene copolymer pellets having an ethylene content of 96.5 mole %, a melting point of 120° C., a melt index (190° C., 2.16 kg) of 18 g/10 min. and a density of 0.920, 25 parts by weight of polypropylene pellets having a melt index (230° C., 2.16 kg) of 11 g/10 min. and a density of 0.91, and a solution of 0.2 part by weight of 2,5-dimethyl-2,5-di(t-butylperoxy)hexyne-3 and 0.3 part by weight of divinylbenzene in 0.5 part by weight of a paraffinic mineral oil were mixed to disperse the resin pellets uniformly, and uniformly adhering the solution to the surfaces of the pellets. The mixture was then extruded through a twin-screw extruder at 230° C. in an atmosphere of nitrogen to obtain a thermoplastic elastomer.

The thermoplastic elastomer was formed into a sheet having a thickness of 0.08 mm by an extruder equipped with a T-die. The film formability of the elatomer and its debossing property on a hot plate press (140° C., 20 seconds) were evaluated, and the results are shown in Table 1. Table 1 also shows various other properties of the elastomer.

EXAMPLE 2

A thermoplastic elastomer was prepared in the same way as in Example 1 except that 45 parts by weight of EPDM (a), 30 parts by weight of ethylene/4-methyl-1-pentene copolymer and 30 parts by weight of polypropylene were used. The various properties of the elastomer are shown in Table 1.

COMPARATIVE EXAMPLE 1

A thermoplastic elastomer was prepared in the same way as in Example 1 except that the ethylene/4-methyl-1-pentene was not used, and 70 parts by weight of EPDM (a) and 30 parts by weight of polypropylene were used. The various properties of the elastomer are shown in Table 1.

COMPARATIVE EXAMPLE 2

A thermoplastic elastomer was prepared in the same way as in Example 1 except that high-pressure low-density polyethylene pellets having a density of 0.915 were used instead of the ethylene/4-methyl-1-pentene. The various properties of the elastomer are shown in Table 1.

Film formability

The film formability was evaluated based on the following standard.
◎ : film was formed excellently stably.
○: film was formed stably.
×: film was not formed stably because of the breakage of the sheet.

Debossing property

A sample sheet of thermoplastic polymer, 0.3 mm thick, was extruded by using the above-described T-die-equipped extruder. The sheet was bonded to a polyethylene foam by using rolls. The roll in contact with the sheet was an embossing roll, while the other roller was a rubber roller. Thus, an embossed composite sheet of thermoplastic elastomer/polyethylene foam having a thickness of 3.3 mm was produced. The composite sheet was placed in a metal frame with a thickness of 2.5 mm, held between press plates, and hot-pressed at 140° C. for 20 seconds.

After hot pressing, the state of the emboss was visually observed, and evaluated on the following standard.
◎ : The state of emboss remained quite unchanged.
○: The state of emboss remained unchanged.
×: The emboss became shallower.

EXAMPLE 3

By a Banbury mixer, 30 parts by weight of ethylene/propylene/dicyclopentadiene copolymer (to be referred to as EPDM (b)) having an ethylene content of 78 mole %, an iodine number of 10 and a Mooney viscosity ($ML_{1+4}$, 100° C.) of 150, 30 parts by weight of ethylene/4-methyl-1-pentene copolymer having an ethylene content of 96.5 mole %, a melting point of 120° C., a melt index (190° C., 2.16 kg) of 18 g/10 min. and a density of 0.920, 30 parts by weight of polypropylene having a melt index (230° C., 2.16 kg) of 11 g/10 min. and a density of 0.91, 10 parts by weight of a paraffinic process oil and 0.3 parts by weight of an antioxidant were kneaded at 180° C. for 5 minutes in an atmosphere of nitrogen. The mixture was passed through rolls and pelletized by a sheet cutter.

The resulting pellets were mixed with a solution of 0.2 part by weight of 1,3-bis(tert-butyl peroxyisopropyl)benzene, 0.3 part by weight of divinylbenzene and 0.5 part by weight of a paraffinic mineral oil by a Hensche mixer to adhere the solution uniformly on the surfaces of the pellets. The pellets were then extruded by an extruder in an atmosphere of nitrogen at 210° C. with a residence time of 5 minutes to heat-treat them dynamically and thus obtain a thermoplastic elastomer.

The thermoplastic elastomer was formed into a sheet having a thickness of 1.5 mm by using an extruder equipped with a T-die. The properties of the sheet were evaluated on the basis of the standards of vulcanized rubbers in JIS A-6008 "Synthetic Polymeric Roofing". The results are shown in Table 1.

The standardized values of a waterproof sheet in accordance with JIS A-6008 are shown in Table 2.

COMPARATIVE EXAMPLE 3

A sheet having a thickness of 1.5 mm was prepared in the same way as in Example 3 except that the ethylene/4-methyl-1-pentene copolymer was not used, the amount of EPDM (b) was changed to 50 parts by weight and the amount of the parafinnic process oil was changed to 20 parts by weight.

The properties of the sheet were evaluated on the basis of the standards of vulcanized rubbers in JIS A-6008 "Synthetic Polymeric Roofing". The results are shown in Table 1.

COMPARATIVE EXAMPLE 4

A sheet having a thickness of 1.5 mm was prepared in the same way as in Example 3 except that the amount of EPDM (b) was changed to 35 parts by weight, and the amount of the ethylene/4-methyl-1-pentene copolymer was changed to 20 parts by weight. The properties of the sheet are shown in Table 1.

TABLE 1

| Example (Ex.) or Comparative Example (C. Ex.) | Ex. 1 | Ex. 2 | C. Ex. 1 | C. Ex. 2 | Ex. 3 | C. Ex. 3 | C. Ex. 4 |
|---|---|---|---|---|---|---|---|
| Recipe | | | | | | | |
| EPDM (a) rubber | 55 | 45 | 70 | 55 | | | |
| EPDM (b) rubber | | | | | 30 | 50 | 35 |
| ethyl-4-methyl-1-pentene copolymer | 20 | 30 | | | 30 | | 20 |
| LDPE | | | | 20 | | | |
| HDPE | | | | | | | |
| polypropylene | 25 | 30 | 30 | 25 | 30 | 30 | 30 |
| Properties of the elastomer | | | | | | | |
| MFR (230° C., 10 kg) g/10 min | 11.4 | 12.5 | 5.0 | 5.8 | | | |

TABLE 1-continued

| Example (Ex.) or Comparative Example (C. Ex.) | | Ex. 1 | Ex. 2 | C. Ex. 1 | C. Ex. 2 | Ex. 3 | C. Ex. 3 | C. Ex. 4 |
|---|---|---|---|---|---|---|---|---|
| Density g/cm$^3$ | | 0.89 | 0.89 | 0.89 | 0.89 | | | |
| Hardness (JIS-A) | | 86 | 88 | 84 | 84 | | | |
| 100% Modulus kg/cm$^2$ | | 40 | 50 | 35 | 44 | | | |
| Tensile strength kg/cm$^2$ | | 100 | 120 | 80 | 90 | | | |
| Elongation % | | 630 | 600 | 550 | 530 | | | |
| T-die film formability | | ○ | ◎ | X | ○ | | | |
| Debossing | | ○ | ○ | ◎ | X | | | |
| Properties of the sheet | | | | | | | | |
| M300 (kg/cm$^2$) | 20° C. | | | | | 73 | 66 | 63 |
| TM (kg/cm$^2$) | −20° C. | | | | | 240 | 340 | 300 |
| | 20° C. | | | | | 130 | 100 | 110 |
| | 60° C. | | | | | 70 | 60 | 65 |
| EB (%) | −20° C. (between chucks) | | | | | 360 | 390 | 390 |
| | 20° C. | | | | | 700 | 600 | 650 |
| TR (kg/cm) | −20° C. | | | | | 110 | 84 | 100 |
| | 20° C. | | | | | 66 | 47 | 54 |
| | 60° C. | | | | | 36 | 28 | 30 |

TABLE 2

| Item | Test temperature (°C.) | JIS standard values |
|---|---|---|
| Tensile strength (kg/cm$^2$) | | |
| Non-treated | −20 | not more than 200% of the test value obtained at 20° C. without treatment |
| | 20 | at least 75 but less than 150 |
| | 60 | at least 30% of the test value obtained at 20° C. without treatment |
| Tensile stress at 300% stretch (kg/cm$^2$) | | |
| Non-treated | 20 | at least 30 |
| After heating | 20 | 80 to 150% of the test value obtained at 20° C. without treatment |
| Elongation at break (%) | | |
| Non-treated | −20 | at least 200 |
| | 20 | at least 450 |
| Tear strength (kg/cm) | | |
| Non-treated | −20 | not more than 200% of the test value obtained at 20° C. without treatment |
| | 20 | at least 25 |
| | 60 | at least 30% of the test value obtained at 20° C. without treatment |

We claim:

1. A thermoplastic elastomer composed of a partially crosslinked product of a blend consisting essentially of
   (a) 60 to 30 parts by weight of a peroxide-crosslinkable olefin copolymer rubber,
   (b) 20 to 40 parts by weight of a peroxide-crosslinkable polyolefin resin, and
   (c) 40 to 20 parts by weight of a peroxide-decomposable polyolefin resin,
the total amount of (a)+(b)+(c) being 100 parts weight, said crosslinked product being obtained by dynamically heat-treating said blend in the presence of (d) an organic peroxide, and said peroxide-crosslinkable polyolein resin (b) being a linear low density polyethylene composed of a random copolymer of ethylene and an alpha-olefin having 4 to 10 carbon atoms, said linear low density polyethylene having an ethylene content of from 90 to 99.5 mole %, a melt index of from 0.1 to 50 g/10 min., a density of from 0.910 to 0.940 g/cm$^3$ and a melting point of from 115° to 130° C.

2. The elastomer of claim 1 wherein said blend further comprises a softening agent of the mineral oil type.

3. The elastomer of claim 1 wherein the organic peroxide (d) is used in an amount of from 0.05 to 3% by weight based on the total weight of the components (a), (b) and (c).

4. The elastomer of claim 1 wherein the peroxide-crosslinkable olefin copolymer rubber is an ethylene/propylene copolymer rubber or ethylene/propylene/non-conjugated diene copolymer rubber in which the mole ratio of ethylene to propylene is from 50:50 to 85:15.

5. The elastomer of claim 1 wherein the peroxide-decomposable polyolefin resin (c) is a homopolymer of an alpha-olefin having at least 3 carbon atoms or a copolymer of at least two alpha-olefins having at least 3 carbon atoms.

6. The elastomer of claim 5 wherein the peroxide-decomposable polyolefin resin (c) is a homo- or copolymer of propylene, 1-butene, 4-methyl-1-pentene, 1-hexene, 1-octene or 1-decene.

7. The elastomer of claim 6 wherein the peroxide-decomposable resin (c) is polypropylene.

8. The elastomer of claim 6 wherein the peroxide-decomposable polyolefin resin (c) is a copolymer containing at least 50 mole % of propylene units.

9. The elastomer of claim 5 wherein the peroxide-decomposable polyolefin resin (c) has a melt index of 0.1 to 50 g/min.

10. A waterproof sheet molded from the thermoplastic elastomer claimed in claim 1.

11. The waterproof sheet of claim 10 wherein said blend further contains not more than 50% by weight, based on the total weight of (a), (b) and (c), of a softening agent of the mineral oil type.

12. The waterproof sheet of claim 10 wherein said blend further comprises not more than 40% by weight, based on the total weight of (a), (b) and (c), of a filler.

* * * * *